US012211268B2

(12) United States Patent
Nitto et al.

(10) Patent No.: US 12,211,268 B2
(45) Date of Patent: Jan. 28, 2025

(54) INFORMATION PROCESSING SYSTEM, A SERVER APPARATUS, AND INFORMATION PROCESSING METHOD

(71) Applicant: Canon Kabushiki Kaisha, Tokyo (JP)

(72) Inventors: Yuuichi Nitto, Kanagawa (JP); Kohei Iwabuchi, Kanagawa (JP); Kentaro Saito, Kanagawa (JP); Masaji Munekuni, Kanagawa (JP); Satoru Mamiya, Kanagawa (JP); Tatsuya Yamamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 435 days.

(21) Appl. No.: 17/680,796

(22) Filed: Feb. 25, 2022

(65) Prior Publication Data
US 2022/0180631 A1  Jun. 9, 2022

Related U.S. Application Data

(63) Continuation of application No. PCT/JP2020/031712, filed on Aug. 21, 2020.

(30) Foreign Application Priority Data

Aug. 29, 2019 (JP) ................. 2019-156799

(51) Int. Cl.
*G06V 20/10* (2022.01)
*G06V 10/74* (2022.01)
(Continued)

(52) U.S. Cl.
CPC .......... *G06V 20/188* (2022.01); *G06V 10/761* (2022.01); *G06V 20/30* (2022.01); *H04L 67/12* (2013.01)

(58) Field of Classification Search
CPC .... G06V 20/188; G06V 20/30; G06V 10/761; H04L 67/12
See application file for complete search history.

(56) References Cited

U.S. PATENT DOCUMENTS 10,262,244 B2 * 4/2019 Yamaguchi .............. A01G 7/00
2022/0021734 A1 * 1/2022 Ratias ................... H04L 9/0816

FOREIGN PATENT DOCUMENTS

JP    2010086174 A    4/2010
JP    2011192022 A    9/2011
(Continued)

OTHER PUBLICATIONS

International Search Report issued in corresponding parent International Application No. PCT/JP2020/031712 dated Nov. 10, 2020.

*Primary Examiner* — Shefali D Goradia
(74) *Attorney, Agent, or Firm* — Venable LLP

(57) ABSTRACT

There is provided with an information processing system including a server apparatus, and a first apparatus and a second apparatus that are able to communicate with the server apparatus. A management unit collects, based on a predetermined reference, each piece of data that is acquired from the first apparatus and is associated with each of a plurality of images and manage the collected data. An image identification unit identifies at least a portion of the plurality of images based on the collected data. A sending unit sends the at least a portion of the plurality of images that is identified by the image identification unit, to the second apparatus.

18 Claims, 14 Drawing Sheets

(51) Int. Cl.
  *G06V 20/30* (2022.01)
  *H04L 67/12* (2022.01)

(56) References Cited

FOREIGN PATENT DOCUMENTS

| | | |
|---|---|---|
| JP | 2012050012 A | 3/2012 |
| JP | 2013156784 A | 8/2013 |
| JP | 2017055745 A | 3/2017 |
| JP | 2018125591 A | 8/2018 |

* cited by examiner

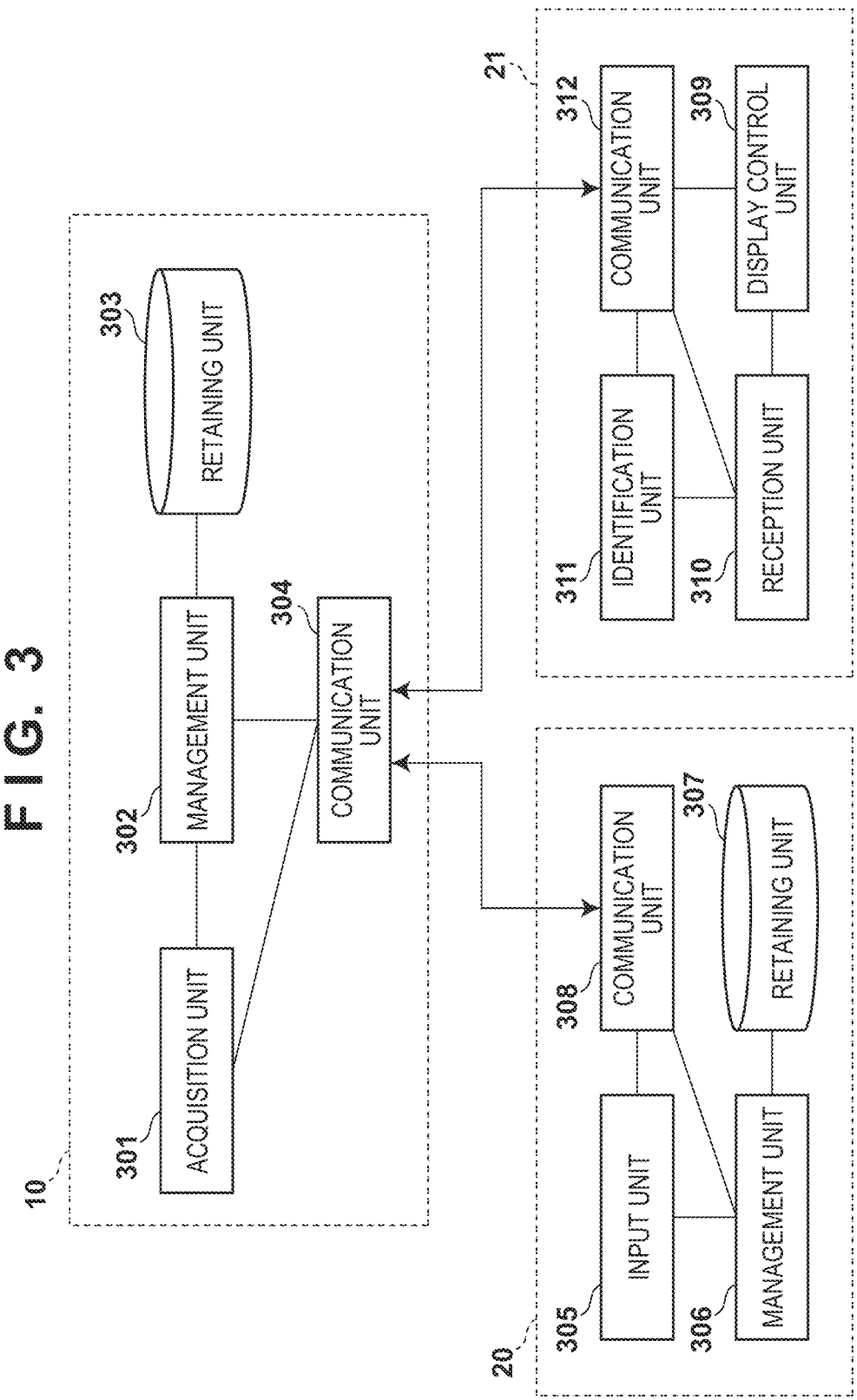

FIG. 6

| 601 | 602 DATA DATE AND TIME | 603 DATA COORDINATES | 604 DATA TYPE | 605 DATA DETAILS | 606 IMAGE IDENTIFIER | 607 TRANSMISSION STATUS |
|---|---|---|---|---|---|---|
| | 2019/4/1 12:00:00 | | Yield estimation | 10t | 012e21... | IMAGE SENT |
| | 2019/4/1 13:01:02 | (200, 200) | Powdery mildew | 3% | 148a6a... | DATA SENT |
| | 2019/4/1 13:20:25 | (150, 100) | Botrytis | 10% | 28bcb1... | DATA SENT |
| | 2019/4/2 10:21:10 | | Bunch weight | 100g | | NOT SENT |
| | 2019/4/3 11:34:20 | (170, 170) | Powdery mildew | 6% | 7f88e3... | NOT SENT |

| DATA DATE AND TIME | DATA COORDI-NATES | DATA TYPE | DATA DETAILS | IMAGE IDENTIFIER |
|---|---|---|---|---|
| 2019/4/1 12:00:00 | | Yield estimation | 10t | 012e21... |
| 2019/4/1 13:01:02 | (200, 200) | Powdery mildew | 3% | 148a6a... |
| 2019/4/1 13:20:25 | (150, 100) | Botrytis | 10% | 28bcb1... |

FIG. 7B

| ID | DATA GROUP | STATISTICAL INFORMATION |
|---|---|---|
| Powdery mildew | powdery-mildew.db | Average:3%, Min:1%, Max:6% |
| 2019/4/1 | 20190401.db | |
| Botrytis | botrytis.db | Average:12%, Min:3%, Max:30% |
| 2019/4/2 | 20190402.db | |
| Growth stage | growth-stage.db | |

FIG. 7C

| DATA DATE AND TIME | DATA COORDI-NATES | DATA TYPE | DATA DETAILS | IMAGE IDENTIFIER |
|---|---|---|---|---|
| 2019/4/1 13:01:02 | (200, 200) | Powdery mildew | 3% | 148a6a... |
| 2019/4/4 8:10:45 | (170, 200) | Powdery mildew | 1% | a23de4... |
| 2019/4/4 12:34:56 | | Powdery mildew | 2% | 358962... |
| 2019/4/6 14:09:01 | (150, 230) | Powdery mildew | 4% | 78cc25... |
| 2019/4/7 9:54:21 | (120, 210) | Powdery mildew | 6% | 7f88e3... |

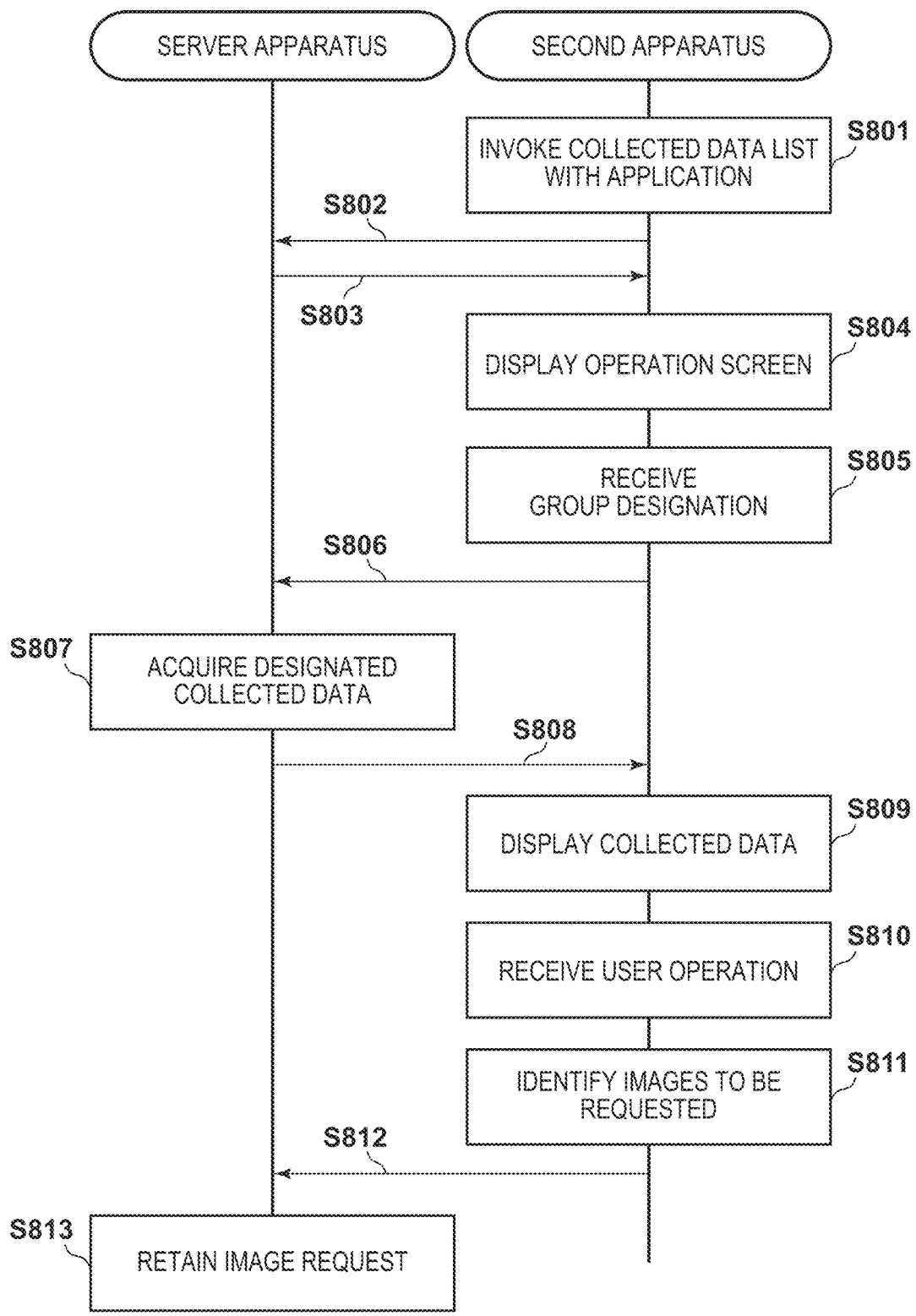

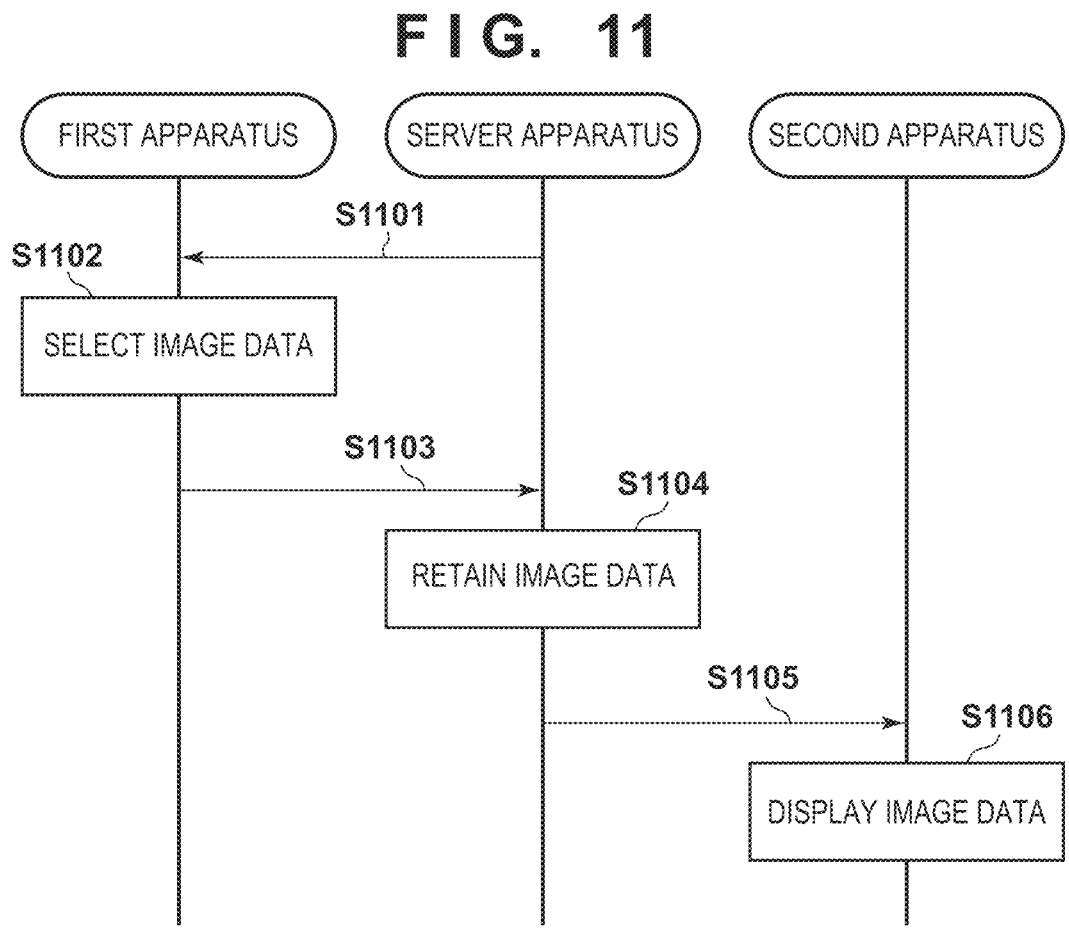

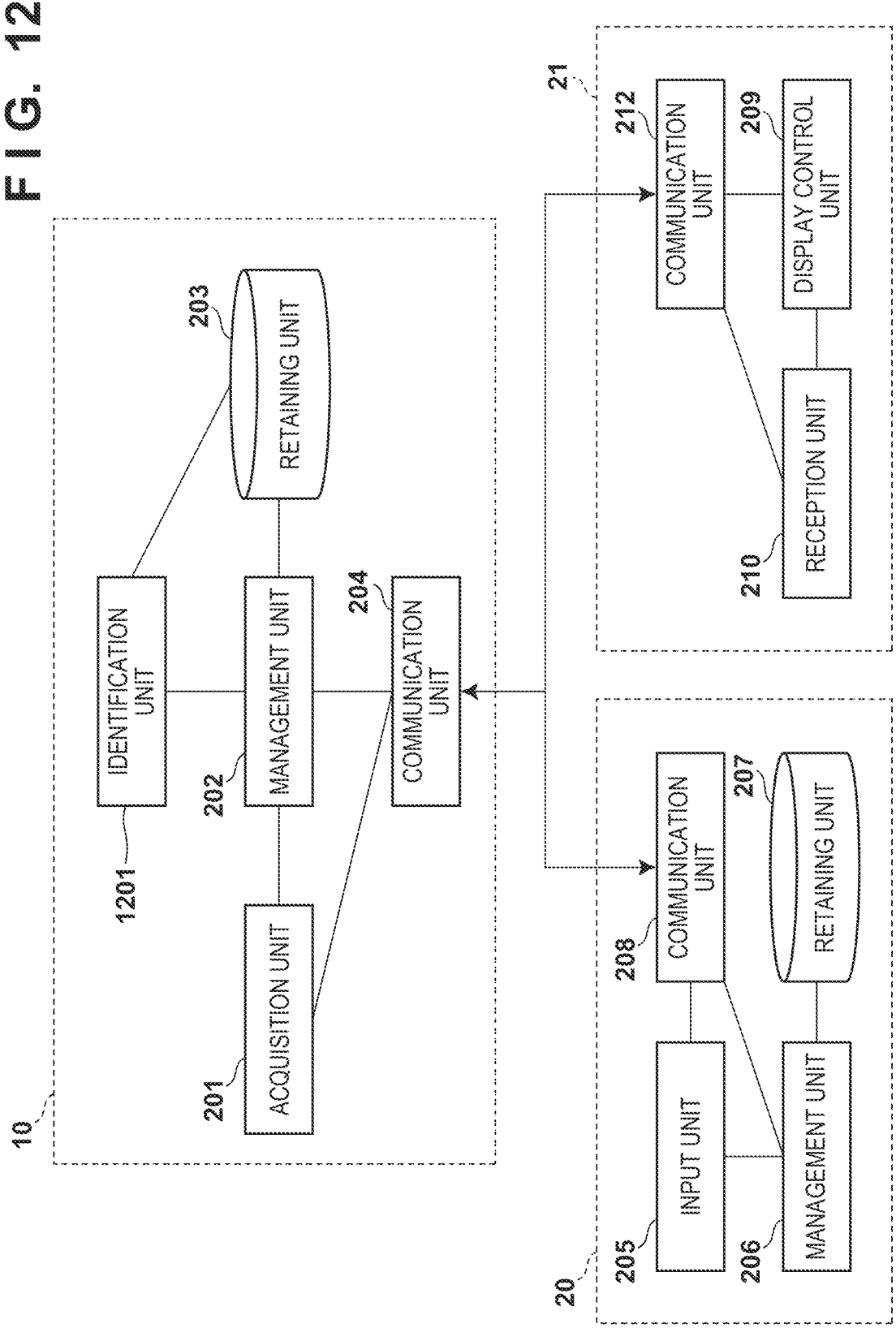

- Powdery mildew
- Botrytis
- 2019/4/1

CONDITION FOR IMAGES TO BE REQUESTED

- MINIMUM VALUE: 0 IMAGES
- MAXIMUM VALUE: 5 IMAGES
- AVERAGE: 3 IMAGES

- Powdery mildew
- Botrytis
- 2019/4/1

CONDITION FOR IMAGES TO BE REQUESTED

- HIGH FREQUENCY: 3 IMAGES
- LOW FREQUENCY: 3 IMAGES

| ID (1501/1502) | IMAGE IDENTIFICATION CONDITION (1503) |
|---|---|
| Powdery mildew | MAXIMUM VALUE 5 IMAGES & AVERAGE 3 IMAGES |
| 2019/4/1 | HIGH FREQUENCY 3 IMAGES & LOW FREQUENCY 3 IMAGES |
| Botrytis | MAXIMUM VALUE 10 IMAGES |

1504

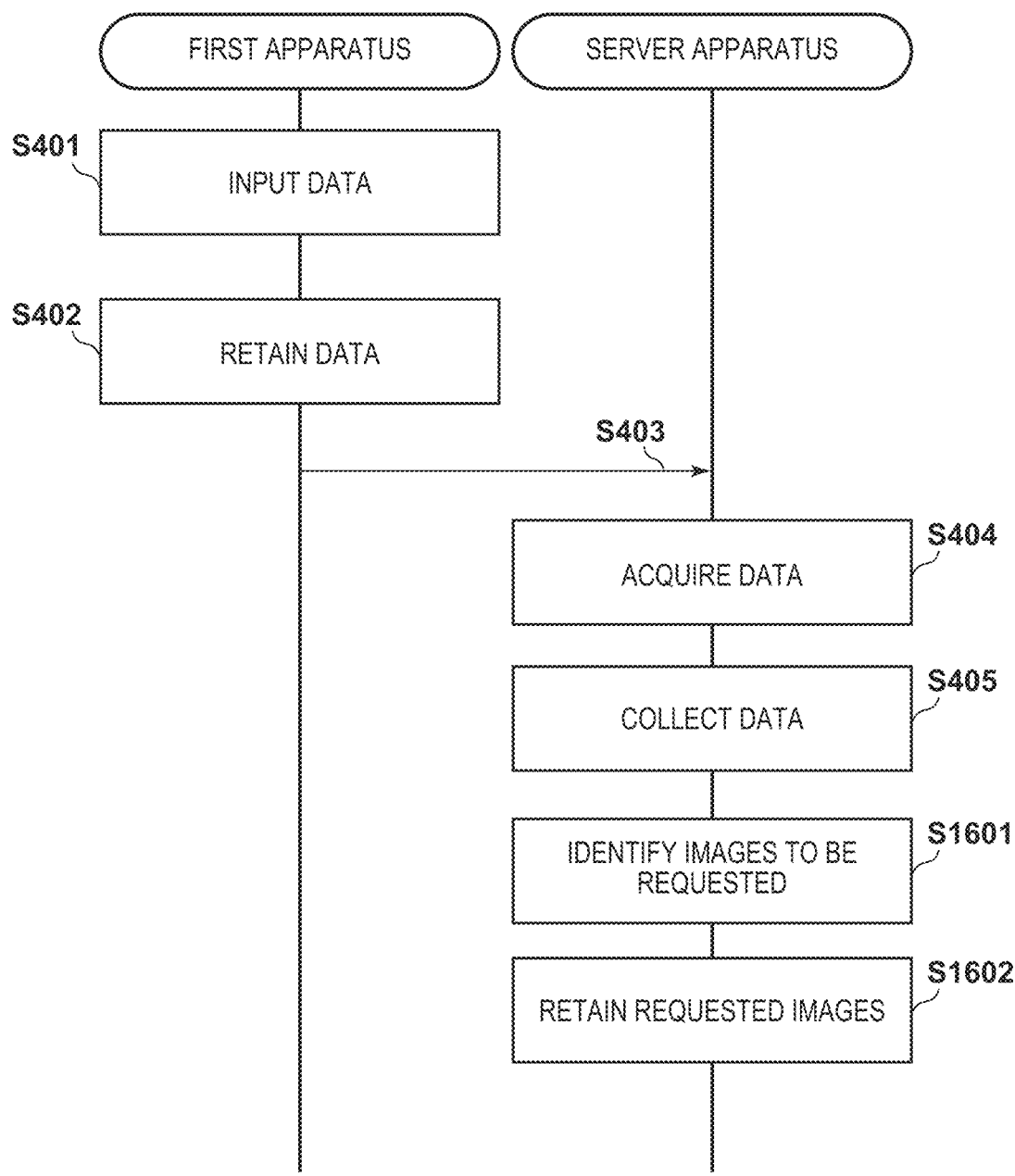

| DATA DATE AND TIME | DATA COORDI-NATES | DATA TYPE | DATA DETAILS | IMAGE IDENTIFIER | |
|---|---|---|---|---|---|
| 2019/5/1 9:09:21 | (190, 200) | Powdery mildew | 3% | 42879a... | ⎫ |
| 2019/5/4 10:21:34 | (150, 100) | Powdery mildew | 3% | 52eabb... | ⎬ 1702 |
| 2019/5/4 12:43:23 | | Powdery mildew | 2% | 078100... | |
| 2019/5/5 11:53:40 | (220, 200) | Powdery mildew | 6% | 6f02ed... | — 1703 |
| 2019/5/5 15:41:22 | | Powdery mildew | 4% | aa578c... | |

| IMAGE IDENTIFIER | REQUEST STATUS | |
|---|---|---|
| 42879a... | REQUESTING | ⎫ |
| 52eabb... | REQUESTING | ⎬ 1705 |
| 078100... | RETAINED | |
| 6f02ed... | REQUESTING | — 1706 |
| aa578c... | RETAINED | — 1707 |

INFORMATION PROCESSING SYSTEM, A SERVER APPARATUS, AND INFORMATION PROCESSING METHOD

CROSS-REFERENCE TO RELATED APPLICATIONS

This application is a Continuation of International Patent Application No. PCT/JP2020/031712, filed Aug. 21, 2020, which claims the benefit of Japanese Patent Application No. 2019-156799 filed on Aug. 29, 2019, both of which are hereby incorporated by reference herein in their entirety.

BACKGROUND OF THE INVENTION

Field of the Invention

The present invention relates to an information processing system, a server apparatus, and an information processing method.

Background Art

In recent years, systems in which various work records are recorded along with images and are shared are considered. In these systems, effective information sharing and quick problem finding and solving are possible by reporting recorded images to a person in charge or a knowledgeable person in a remote place. However, the amount of images, which are work records, is huge, and therefore there are cases where it is difficult to share all images. It is possible that, if the judgment for selecting images to be reported is performed by a person on a reporter side, the image desired by a person in charge or a knowledgeable person is not always reported, and therefore, in Japanese Patent Laid-Open No. 2010-86174, a method in which a person on an image receiving side selects images to be sent is proposed. In Japanese Patent Laid-Open No. 2010-86174, a technique is disclosed in which a terminal that has shot images (shooting terminal) creates index data from the images, and sends the index data to a terminal on the image receiving side (receiving terminal). The receiving terminal presents the received index data, and sends, to the shooting terminal, a sharing request regarding images selected by a user on the receiving side from the index data. The shooting terminal sends the image regarding which sharing is requested to the receiving terminal.

CITATION LIST

Patent Literature

PTL 1 Japanese Patent Laid-Open No. 2010-86174

SUMMARY OF THE INVENTION

According to one embodiment of the present invention, an information processing system including a server apparatus, and a first apparatus and a second apparatus that are able to communicate with the server apparatus, the information processing system comprises: a management unit configured to collect, based on a predetermined reference, each piece of data that is acquired from the first apparatus and is associated with each of a plurality of images and manage the collected data; an image identification unit configured to identify at least a portion of the plurality of images based on the collected data; a sending unit configured to send the at least a portion of the plurality of images that is identified by the image identification unit, to the second apparatus.

According to another embodiment of the present invention, a server apparatus that is able to communicate with a client apparatus, the server apparatus comprises: a collecting unit configured to collect each piece of data associated with each of a plurality of images that are shot as an observation record of crop cultivation, based on observation details of a crop indicated by the pieces of data; a determining unit configured to determine an image to be sent to the client apparatus, among the plurality of images, based on a collection result of the collecting unit; and a first sending unit configured to send, to the client apparatus, at least one or more images, among the plurality of images, determined by the determining unit.

According to still another embodiment of the present invention, an information processing method by an information processing system including a server apparatus, and a first apparatus and a second apparatus that are able to communicate with the server apparatus, the information processing method comprises: collecting, based on a predetermined reference, each piece of data that is acquired from the first apparatus and is associated with each of a plurality of images and manage the collected data; identifying at least a portion of the plurality of images based on the collected data; sending the at least a portion of the identified plurality of images to the second apparatus.

According to yet another embodiment of the present invention, an information processing method by a server apparatus that is able to communicate with a client apparatus, the information processing method comprises: collecting each piece of data associated with each of a plurality of images that are shot as an observation record of crop cultivation, based on observation details of a crop indicated by the pieces of data; determining an image to be sent to the client apparatus, among the plurality of images, based on the collection result; and sending, to the client apparatus, at least one or more images, among the determined plurality of images.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 3 is a diagram illustrating an example of a functional configuration of the information processing system.

FIG. 6 is a table showing an example of data to be processed in the information processing system.

FIG. 7A is a table showing an example of data to be processed in the information processing system.

FIG. 7B is a table showing an example of data to be processed in the information processing system.

FIG. 7C is a table showing an example of data to be processed in the information processing system.

FIG. 8 is a sequence diagram showing a flow of processing performed by the constituent elements of the information processing system.

FIG. 10 is a table showing an example of data to be processed in the information processing system.

FIG. 11 is a sequence diagram showing a flow of processing performed by the constituent elements of the information processing system.

FIG. 12 is a diagram illustrating an example of a functional configuration of the information processing system.

FIG. 14A is a diagram illustrating an example of a user interface that is displayed in a client apparatus.

FIG. 14B is a diagram illustrating an example of a user interface that is displayed in a client apparatus.

FIG. 15 is a table showing an example of data to be processed in the information processing system.

FIG. 16 is a sequence diagram showing a flow of processing performed by the constituent elements of the information processing system.

FIG. 17A is a table showing an example of data to be processed in the information processing system.

FIG. 17B is a table showing an example of data to be processed in the information processing system.

DESCRIPTION OF THE EMBODIMENTS

Figure 1:
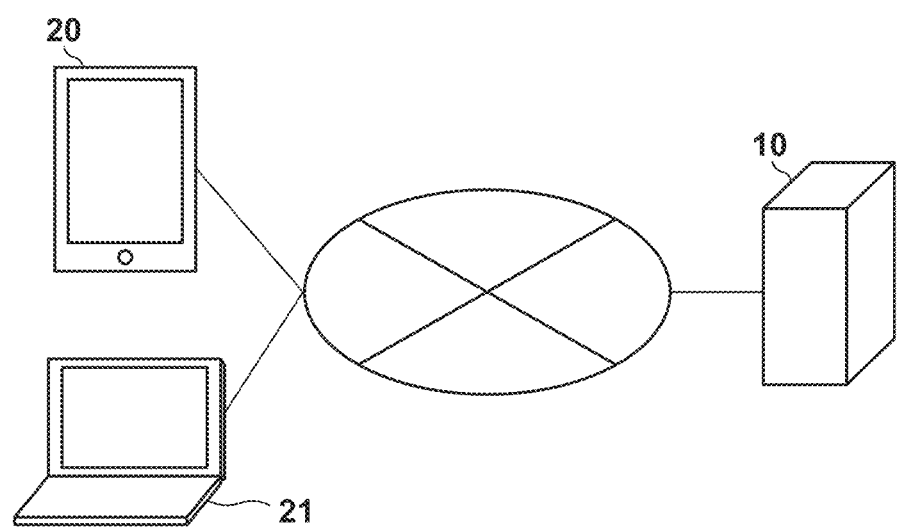
FIG. 1 illustrates a configuration of an information processing system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In a field of crop cultivation as well, various phenomena that have occurred in a farm field, work states, work results, and the like are shot and recorded as images. Furthermore, these images are provided to a person in charge/knowledgeable person who is in a remote place as reports thereto, and a manager who has checked the situation of crops from the image details may issue an instruction. However, in the crop cultivation, many flowers, leaves, fruits, or the like that are shooting targets to be recorded as images have similar shape and color, and as a result, a large number of similar images are recorded. Therefore, there are cases where it is difficult for the person in charge/knowledgeable person to determine the images that should be checked, by a quick glance at the list of shooting date and time and thumbnails. In these cases, as in the technique disclosed in Japanese Patent Laid-Open No. 2010-86174, it is difficult for a person on an image receiving side to select images to be shared based on index data of information representing image outlines such as thumbnails and shooting date and time. On the other hand, a large number of images are daily recorded, and therefore it is possible that a tremendous communication load is incurred and huge storage capacity of a server apparatus or the like is consumed in order to send, to the server apparatus or the like in advance, all image data that may be requested by the side to which the image data is provided, and the data is retained in the server apparatus or the like.

First Embodiment

In the present embodiment, an information processing system in which data regarding crop cultivation is collected and managed is illustrated as an example. Specifically, an example of a system will be described in which images, among images recorded regarding crop cultivation, that are desired by a person in charge/knowledgeable person who is in a remote place can be efficiently shared.

In crop cultivation, the growth state of crops, the situation of damages caused by disease and pest, and the like are digitized and managed. In many cases, viewing the record in crop cultivation together with images obtained by shooting the objects to be observed (parts of crops such as buds, anthotaxy, leaves, and fruits, and states of soil, facilities, and the like are included, for example) enables effective information sharing and quick problem finding and solving. For example, in a task of understanding the situation of damages due to crop disease, a worker shoots images of parts that are infected by the disease such as leaves and culms, along with judging and recording the degree of progress of the disease. The worker reports the shot images along with information regarding the judged degree of progress to a person in charge of cultivation or a knowledgeable person who is in a remote place. As a result of receiving reports regarding the degree of progress of the disease along with images, the person in charge or knowledgeable person can understand the situation of damages that the worker did not notice and the place that should be taken care of with a higher priority, and can perform appropriate judgment objectively. Therefore, in the present embodiment, means for identifying and providing images that are desired by a person in charge or a knowledgeable person based on data collected at the time of shooting is provided.

System Configuration

FIG. 1 is a diagram illustrating an exemplary configuration of an information processing system according to the present embodiment. In FIG. 1, the information processing system includes a server apparatus 10, a first client apparatus 20, and a second client apparatus 21. The server apparatus 10 and the client apparatuses 20 and 21 are connected such that bidirectional communication is possible by known communication techniques such as the Internet, a mobile phone network and other communication networks, a wireless LAN (Local Area Network), and near field communication. The server apparatus 10 is an information processing apparatus that functions as a cloud on a network, for example. The server apparatus 10 collects data that is input via the first client apparatus 20. Furthermore, the server apparatus 10 acquires a user instruction that is input via the second client apparatus 21, and outputs data according to the instruction from the collected data. In the present embodiment, data regarding crop cultivation that is input by a user to the first client apparatus 20 is sent to the server apparatus 10. The second client apparatus 21 sends a user instruction regarding the collected data to the server apparatus 10, and displays data output from the server as a response. Furthermore, the second client apparatus 21 identifies a desired image from a user instruction regarding the displayed collected data, and sends an image request to the server apparatus 10. Note that a plurality of first client apparatuses 20 or second client apparatuses 21 may be present.

Hardware Configuration

Figure 2A:
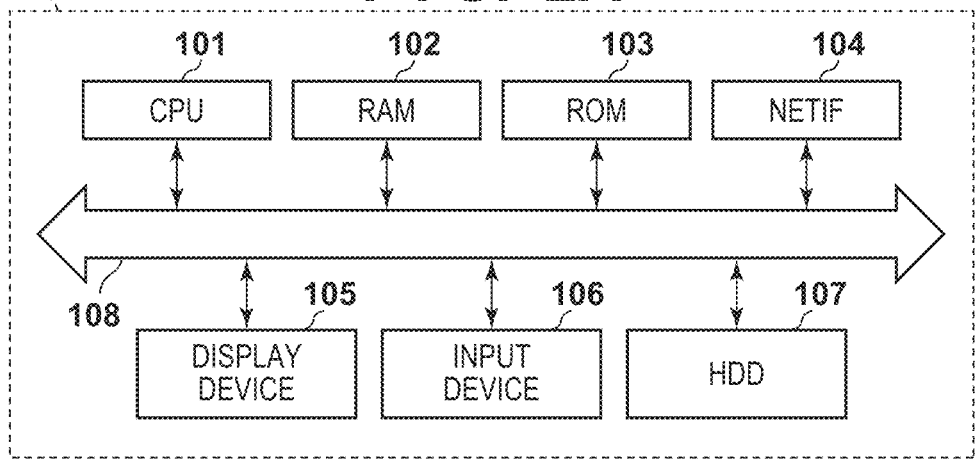
FIG. 2A is a diagram illustrating an example of a hardware configuration of an apparatus that constitutes the information processing system.
Figure 2B:
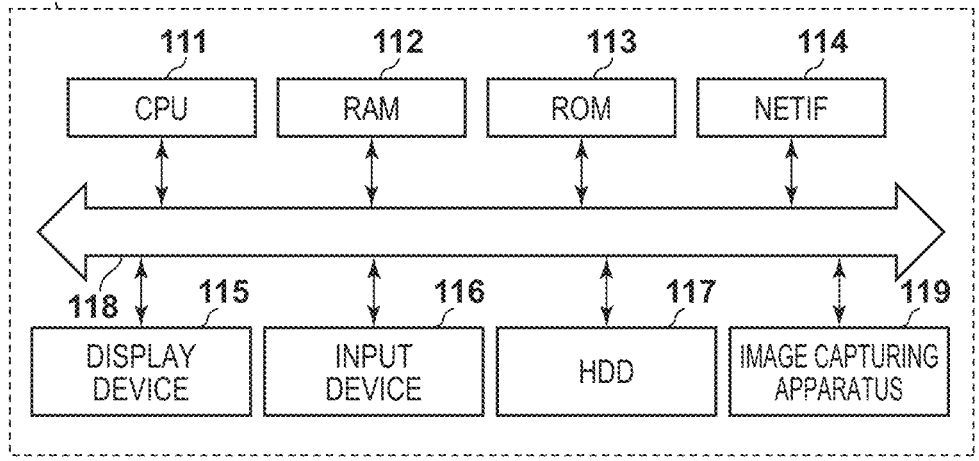
FIG. 2B is a diagram illustrating an example of a hardware configuration of an apparatus that constitutes the information processing system.
Figure 2C:
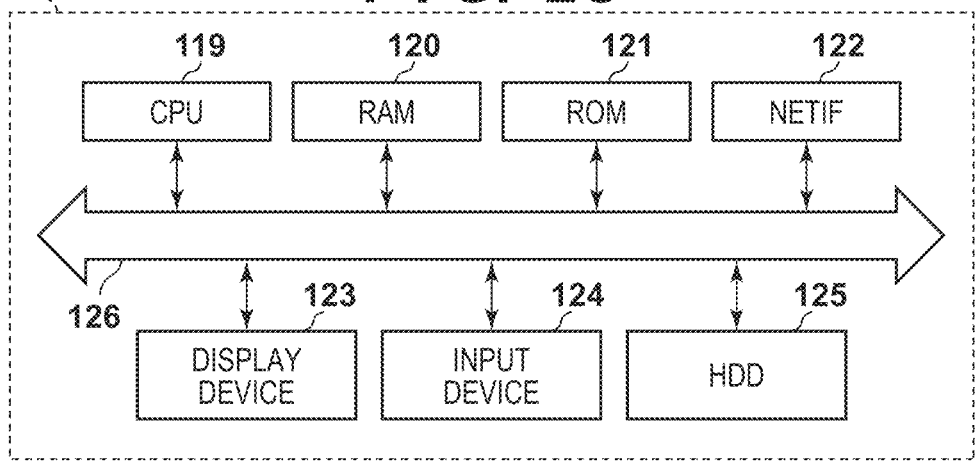
FIG. 2C is a diagram illustrating an example of a hardware configuration of an apparatus that constitutes the information processing system.

FIGS. 2A to 2C are diagrams illustrating examples of hardware configurations of apparatuses that constitute the information processing system. FIG. 2A is a hardware configuration of the server apparatus 10. In the system according to the present embodiment, the server apparatus 10 functions as a management apparatus that manages data and images regarding crop cultivation. A CPU 101 is a central processing unit, performs computational operations and logical decisions for various types of processing, and controls the constituent elements connected to a system bus 108. Memories including a program memory and a data memory are mounted on the server apparatus 10. A RAM (Random Access Memory) 102 is a data memory, and includes a work area of the CPU 101 for the program, a data save area for when error processing is performed, a load area for the control program, and the like. A ROM (Read-Only Memory) 103 is a program memory, and stores programs for control performed by the CPU including various processing procedures, which will be described later. Note that the program memory may be realized by loading a program to the RAM 102 from an external storage apparatus or the like that is connected to the server apparatus 10. A communication interface (L/F) 104 performs wired or wireless bidirectional communication with another information processing apparatus, a communication device, an external storage apparatus, and the like using a known communication technique. In the present embodiment, transmission and reception of data with the client apparatus is enabled via the Internet. The communication with another apparatus includes indirect communication via a relay apparatus in addition to direct communication.

A display device 105 is a CRT display or a liquid crystal display, for example, and is a device that outputs an image to a display screen. The display device 105 may also be an external device that is connected to the server apparatus 10 by wire or wirelessly. An input device 106 is a device for receiving user operation information that is input to the server apparatus 10 via input devices such as a touch panel, a keyboard, and a mouse. Note that in the case of the server apparatus 10 of the present embodiment, the configuration may also be such that the client apparatus is equipped with the functions related to display and input, and the display device 105 and the input device 106 are omitted. An HDD 107 is a hard disk for storing a plurality of pieces of electronic data and programs that are related to the present embodiment. An external storage apparatus may also be used to perform similar functions. Here, the external storage apparatus can be realized by a medium (recording medium) and an external storage drive for realizing access to the medium, for example. A flexible disk (FD), a CD-ROM, a DVD, a USB memory, an MO, a flash memory, or the like is known as such a medium. Also, the external storage apparatus may also be a server apparatus that is connected through a network.

FIG. 2B illustrates a hardware configuration of an information processing apparatus (first information processing apparatus) that functions as a first client apparatus 20. In the system of the present embodiment, the client apparatus 20 functions as a terminal apparatus for inputting data regarding crop cultivation. Similarly to the server apparatus, a CPU 111 performs computational operations of various types of processing and logical decision by executing an OS and programs stored in a ROM 113 and an HDD 117 using a RAM 112 as a work memory, and controls the constituent elements connected to a system bus 118. A communication interface (U/F) 114 performs wired or wireless bidirectional communication with another information processing apparatus, a communication device, an external storage apparatus, and the like using a known communication technique. In the present embodiment, transmission and reception of data with the server apparatus is enabled via the Internet. The communication with another apparatus includes indirect communication via a relay apparatus in addition to direct communication.

A display device 115 is a device that performs a display output in accordance with the control of the CPU 111. Also, the input device 116 is a device for acquiring user operation information that is input to the client apparatus 20 under the control of the CPU 111. In the present embodiment, the client apparatus 20 includes a touch panel display serving as the display device 115 and the input device 116, for example. Also, various sensor devices may be included, and their detection information may be input as data. An image capturing apparatus 127 acquires, as digital image data, an electric signal obtained by performing photoelectric conversion on an optical image that is formed on an image sensor via an optical system. The acquired image data is output to a storage unit that is set in advance. Note that an input interface for acquiring images from an external camera device, in addition to images from the internal image capturing apparatus 127, may also be included. The HDD 117 is a hard disk for storing a plurality of pieces of electronic data and image data and programs according to the present embodiment. Note that an external storage apparatus such as a memory card drive may also be capable of being connected via a network or various interfaces.

The first client apparatus 20 is a smartphone or a tablet PC that a user can carry and operate, for example. In the present embodiment, the user that uses the client apparatus 20 is a worker who works in a farm field or a neighborhood thereof (a place from which the user can quickly go to the farm field and visually recognize or shoot the actual crops), or a manager of the farm field.

FIG. 2C illustrates a hardware configuration of an information processing apparatus (second information processing apparatus) that functions as the second client apparatus 21. The client apparatus 21 also functions as a terminal apparatus that displays data collected in the server apparatus 10. The constituent elements of the hardware configuration from a CPU 119 to a system bus 126 in the client apparatus 21 are similar to those from the CPU 111 to the system bus 118 in the client apparatus 20. Note that, in the present embodiment, the display device 123 functions as a display unit of the entire system. In the present embodiment, the client apparatus 21 is a desktop or laptop PC, for example. Also, the user of the client apparatus 21 in the present embodiment is a person in charge/knowledgeable person that works in a place remote from the farm field (a place from which it incurs cost to go to the farm field and view the actual crops).

Note that, in the present embodiment, an example in which one first client apparatus 20 is included will be described to simplify the description, but a plurality of first client apparatuses 20 may also be connected in a system that is actually operated. For example, when the area of the farm field for cultivating crops is huge, or when one business operator operates a plurality of farm fields that are geographically separated, crop data needs to be collected/managed for each of blocks obtained by dividing a large farm field or for each farm field. In these cases, one first client apparatus 20 may be assigned to each block or each farm field, and images and data are collected. Also, the number of second client apparatuses 21 need not be limited to one. For example, if a configuration is adopted in which an application for displaying an operation screen, which will be described later, can be executed in a WEB application, any apparatus in which a WEB browser is implemented can be used as the second client apparatus 21.

Functional Configuration

FIG. 3 is an example of a block diagram illustrating a software configuration of the entirety of the information processing system according to the present embodiment. First, a functional configuration of an information processing apparatus that functions as the server apparatus 10 will be described. The server apparatus 10 includes an acquisition unit 301, a management unit 302, a retaining unit 303, and a communication unit 304. These functional units are realized by the CPU 101 deploying programs stored in the ROM 103 to the RAM 102, and executing later-described processing. Also, when the system is configured by hardware in place of software processing using the CPU 101, computation units and circuits that perform processing of the functional units described here need only be configured, for example. Furthermore, the server apparatus 10 includes the retaining unit 303 that is a functional unit configured by the HDD 107 or the RAM 102. In the following, the constituent elements will be described.

The acquisition unit 301 acquires data input in the first client apparatus 20 via the communication unit 304. In the present embodiment, the data includes a crop growth state, a degree of progress of disease and pest damage, weather information, sensor information, records of work performed by a worker, and the like that are collected in crop cultivation. At least some data is collected in association with an image obtained by shooting the crops and the surrounding environment. For example, geographical position information regarding the position at which an image has been shot is collected as information regarding the position of an object that has been shot. Note that, the server apparatus 10 of the present embodiment, with respect to data of shot images, receives only image data corresponding to an image request received from the second client apparatus 21, instead of all of the images obtained in the first client apparatus 20. In the present embodiment, instead of acquiring all image data, information collected in association with an image is collected and managed, and therefore all images can be managed. The management unit 302 collects the acquired data. In the present embodiment, the acquired data is collected, and is retained in the retaining unit. Also, an image request is received, and is retained in the retaining unit. Note that "collecting" in the present embodiment at least includes processing for analyzing data and sorting into one or more groups, that is to say, sorting processing. Furthermore, processing for adding, for each group, information indicating the result obtained by analyzing data may also be included. The retaining unit 303 retains data collected by the management unit 302. In the present embodiment, data is retained such that data can be identified in units of collected groups. Also, information regarding requested images is retained.

The communication unit 304 sends and receives data with a communication unit 308 of the first client apparatus 20 and a communication unit 312 of the second client apparatus 21, which will be described later, via the NETIF 104 and a network. In the present embodiment, at least data input in the first client apparatus 20 is received, and collected data is sent to the second client apparatus 21. Also, image requests are sent and received with the client apparatuses.

Next, the functional configuration of an information processing apparatus that functions as the first client apparatus 20 will be described. The client apparatus 20 includes an input unit 305, a management unit 306, and a communication unit 308. These functional units are realized by the CPU 111 deploying programs stored in the ROM 113 to the RAM 112, and executing later-described processing. Also, when the system is configured by hardware in place of software processing using the CPU 111, computation units and circuits that perform processing of the functional units described here need only be configured, for example. Furthermore, the first client apparatus 20 includes a retaining unit 307 that is a functional unit configured by the HDD 107 or the RAM 102. In the following, the constituent elements will be described.

The input unit 305 inputs an image that is shot using the image capturing apparatus 127 and information input through the input device 116 to the system as data. In the present embodiment, the input data includes at least image data, and furthermore, information input through a user interface displayed in a display, information detected by a sensor device, and the like are input. The management unit 306 manages data input in the input unit 305 and an image request received by the communication unit 308. In the present embodiment, the management unit 306 retains input images and various types of information that are recorded in association with the images in the retaining unit 307. Also, related data other than images, of the data retained in the retaining unit 307, is sent to the communication unit 308 at any timing. Also, the image request received by the communication unit 308 is received and the image data indicated by the request is sent to the communication unit 308. The retaining unit 307 retains data sent from the management unit 306. In the present embodiment, information recorded in association with images is retained. The communication unit 308 sends and receives data with the communication unit 304 of the server apparatus 10 via an NETIF 110 and a network. In the present embodiment, data acquired from the management unit 306 is sent, and an image request sent from the server apparatus 10 is received.

Next, the functional configuration of an information processing apparatus that functions as the second client apparatus 21 will be described. The client apparatus 21 includes a display control unit 309, a reception unit 310, an identification unit 311, and a communication unit 312. These functional units are realized by a hardware configuration similar to that of the first client apparatus. The display control unit 309 generates a screen that is to be displayed in the display device 115, and outputs the generated screen. In the present embodiment, a screen for presenting collected data received from the server apparatus 10 via the communication unit 312 is displayed.

The reception unit 310 receives a user instruction for displaying collected data and for identifying images to be requested. In the present embodiment, operations performed on the user interface displayed in the display device 115 are received. The identification unit 311 identifies images that need to be requested using the collected data. In the present embodiment, a portion of the collected data is selected according to the user instruction received through the reception unit 310, and images that need to be requested to the first client apparatus 20 are identified based on the selection.

The communication unit 312 sends and receives data with the communication unit 304 of the server apparatus 10 via the NETIF 110 and a network. In the present embodiment, at least collected data is received from the server apparatus 10, and a specified image request is sent to the server apparatus 10. Note that the functional configuration shown in FIG. 2 is a minimum configuration for realizing the present embodiment, and the devices may further include functional units. For example, the server apparatus may include a display control unit for performing display output to the display device 105.

Processing Flow

Figure 4:
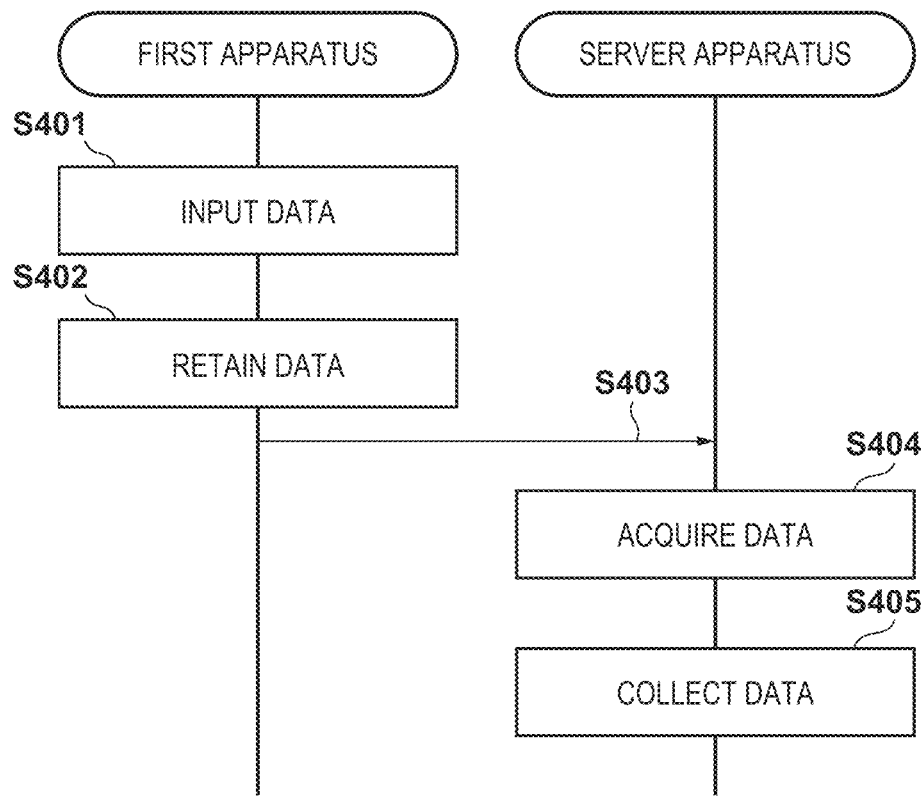
FIG. 4 is a sequence diagram showing a flow of processing performed by the constituent elements of the information processing system.

The flow of processing that the constituent elements of the information processing system execute, in the present embodiment, will be described with reference to the sequence diagram in FIG. 4. In the following, description will be given by denoting the first client apparatus 20 and the second client apparatus 21 as a first apparatus 20 and a second apparatus 21, respectively. Also each step will be described while adding S to the head of its reference symbol.

Figure 5:
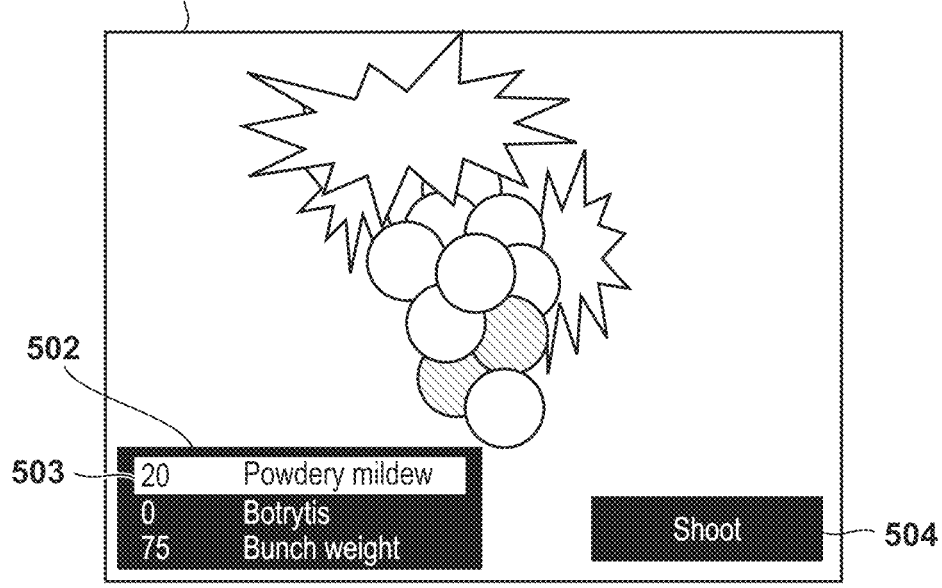
FIG. 5 is a diagram illustrating an example of a user interface that is displayed in a client apparatus.

In step S401, the input unit 305 of the first apparatus 20 inputs data to the system in response to the user operation performed on an image capturing apparatus, a touch panel, and the like. The data in the present embodiment includes an image acquired from an image capturing apparatus, numerical or text information input by a user through the user interface, position information detected by a GPS sensor, and the like. Also, all of the data is input in a state in which an image and other information related thereto are associated. For example, a degree of progress of disease and pest damage is input with respect to a shooting target 501 on a screen as shown in FIG. 5. The user selects an item 502 of powdery mildew, designates a progress degree 503 by a number, and operates a shooting instructor 504. Furthermore, position information is input at the timing at which the shooting instructor 504 is operated. Accordingly, an image obtained by capturing the shooting target 501, information regarding the progress degree 503 of the item 502 of powdery mildew, and position information are input to the system in an associated manner. Note that the input method shown in FIG. 5 is merely an example, and does not limit the present invention. An image in which information is embedded may be input, or images and information may be input from a plurality of external apparatuses, and input to the system in a state in which an image and other information related thereto are associated by using a data time stamp or the like.

In step S402, the management unit 306 retains data input in association with an image to the retaining unit 307. Input data 601 in FIG. 6 illustrates a portion of input data to be retained. Each row in the input data 601 indicates one piece of data that is associated with an image and is input in step S401. For example, each data has values in attributes of data date and time 602, data coordinates 603, a data type 604, data details 605, and an image identifier 606. In the values of the data details 605, values according to the unit or dimension corresponding to the data type 604 are stored. For example, the value indicating the number when the data type is the number of flowers or clusters, and the number indicating the degree of progress when the data type is related to disease infection are stored as data details information. The image identifier 606 is an identifier for uniquely identify an associated image. For example, a hash value is calculated from image binary data as the identifier. The image binary data is retained in the retaining unit 307 so as to be identifiable by the image identifier 606. As a result of using a method of calculating an identifier from image binary data, there is a secondary effect that the images can be managed even in a case where the images are sent and received outside the system.

In step S403, the management unit 306 sends retained input data 601 to the communication unit 304 of the server apparatus 10 via the communication unit 308. Here, data other than the image binary data is sent. That is, in this stage, image data is not sent to the server apparatus 10. For example, the transmission status 607 of the input data 601 is checked, and data that has not been sent to the server apparatus 10, that is, data 608 in a state of "not sent" is sent. The data to be sent may be values of the attributes excluding the transmission status 607. The transmission status 607 of data regarding which transmission is completed is changed to a status indicating that data other than image binary data has been sent to the server apparatus 10, that is, "data sent". Note that the transmission processing may be performed regularly and automatically, or may be started at the timing at which the user explicitly instructed.

In step S404, the acquisition unit 301 of the server apparatus 10 acquires data received by the communication unit 304. Acquired data 701 in FIG. 7A is an example of a portion of data acquired by the server apparatus 10. Attributes similar to those in the input data 601 shown in FIG. 6 have values. In step S405, the management unit 302 collects data acquired by the acquisition unit 301, and retains the collected data in the retaining unit 303. Data collection in the present embodiment is an operation of sorting into a plurality of groups based on the data. For example, data is sorted by input date based on the data date and time 702 of the acquired data 701. Also, sorting may be performed based on the data type 703, that is, the type of disease and pest, or a growth index of a crop. Also, depending on the data type, information indicating the result of analyzing data is further added for each group. For example, when a value is input to the data details 605 such as a degree of progress of disease and pest damage, a statistic value can be calculated using values in the collected data group, and the statistic value can be added. Accordingly, the collected data is retained in the retaining unit 303. The collected data list 705 in FIG. 7B illustrates a portion of the collected data to be retained. An ID 706 is assigned to the collected data as an identifier, and a collected data group 707 and calculated statistical information 708 are retained. For example, when data related to powdery mildew is collected, a table as shown in a powdery mildew data group 709 in FIG. 7C is generated, and is retained in the retaining unit 303. Furthermore, powdery mildew collected data 710 is generated as one item of the collected data list 705, and the powdery mildew data group 709 and a statistic value 711 of the degree of progress are retained in the retaining unit 303. As described above, the server apparatus 10 collects the acquired data 701 according to the data attributes, which are crop observation details represented by corresponding data that is associated with crop images and is crop observation date and time corresponding to the data date and time 702, the crop observation type corresponding to the data type 703, or the like. Note that the server apparatus 10 may collect the acquired data according to the data coordinates corresponding to the position information of the crop observation place or the data details 704 corresponding to a value (observation attribute value) indicating the crop observation result.

Figure 9A:
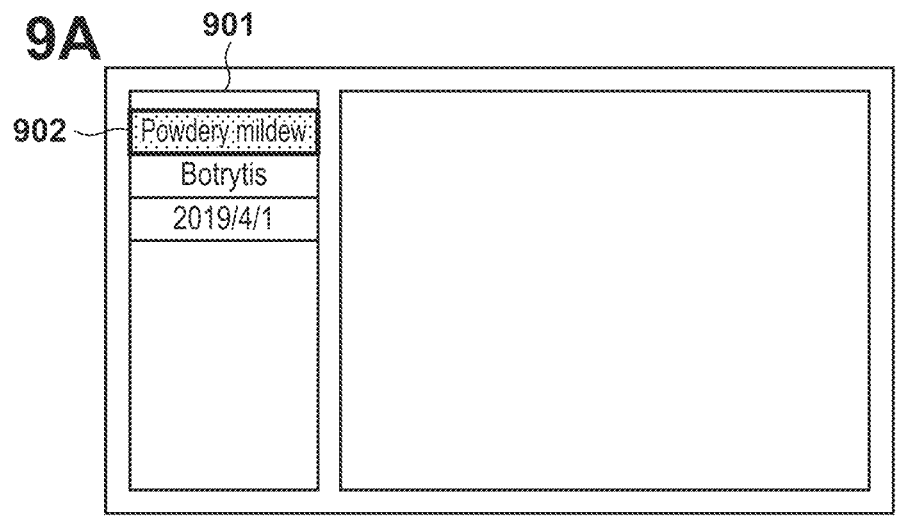
FIG. 9A is a diagram illustrating an example of a user interface that is displayed in a client apparatus.
Figure 9B:
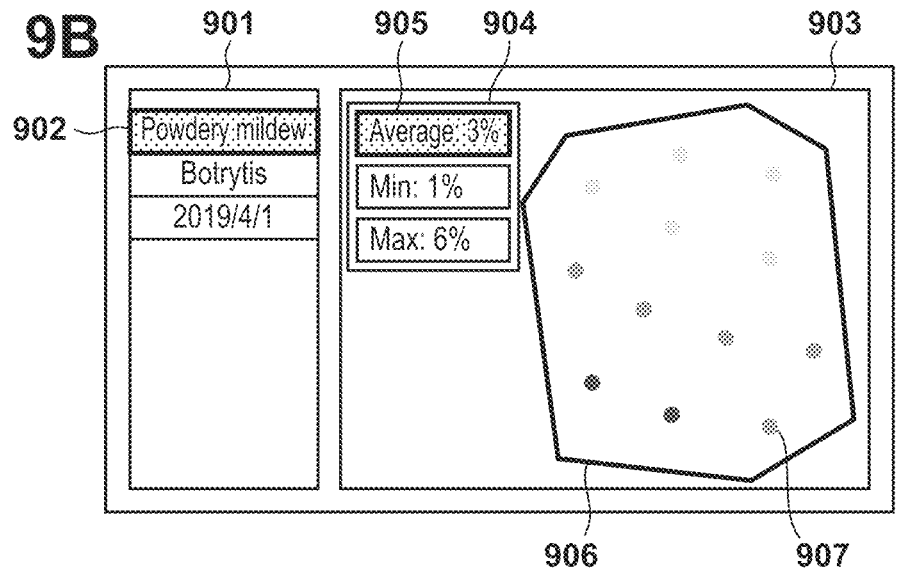
FIG. 9B is a diagram illustrating an example of a user interface that is displayed in a client apparatus.

FIG. 8 is a sequence diagram illustrating the flow of processing executed by the constituent elements of the system according to the first embodiment in a stage of sending an image request in the second apparatus 21. In the second apparatus 21, an application according to the present embodiment is activated, and the CPU 119 executes processing for calling the collected data list 705 managed by the server apparatus 10. Note that, in a system in which a plurality of first apparatuses 20 are connected, a user operation for selecting a specific first apparatus 20, which is the processing target, or a specific farm field may be received in step S801. In step S802, a request for acquiring the collected data list 705 is sent by the communication unit 312 to the communication unit 304 of the server apparatus 10. In step S808, as a response from the server apparatus 10, the collected data list 705 is sent by the communication unit 304 to the communication unit 312 of the second apparatus 21. In step S804, the display control unit 309 displays, in the display device 123, an interface screen (operation screen) including the list of collected data from which desired collected data is selected. The list of collected data is a list of a plurality of groups obtained by sorting data in the collecting processing. Here, FIGS. 9A and 9B are examples of the user interface screen in the present embodiment. FIG. 9A shows an operation screen displayed in the second apparatus 21 in step S804. In a list display area 901, data groups managed by the server apparatus 10 are displayed as a list such that the user can select a plurality of groups.

Note that, in the sequence in FIG. 8, the collected data list 705 managed by the server apparatus 10 is acquired via the communication unit 312 as the items to be listed, but the present embodiment is not limited thereto. A list that is defined in advance as initial values, or a list that was displayed when the application is ended previously may be acquired internally in the second apparatus 21 and used.

In step S805, the reception unit 310 of the second apparatus 21 receives an input for designating the group, on the displayed operation screen, regarding which the analysis result will be displayed. In the screen in FIG. 9A, a state in which an item 902 is designated in the list display area 901 is shown as an example. The item 902 indicates a group in which data regarding powdery mildew is collected. Upon the item 902 being designated by a clicking operation of a mouse or the like, the reception unit 310 receives this instruction. In step S806, a request of acquiring the designated collected data is sent by the communication unit 312 to the communication unit 304 of the apparatus 10.

In step S807, the management unit 302 of the server apparatus 10 acquires the designated collected data from the retaining unit 303. For example, when collected data regarding powdery mildew is designated, a powdery mildew data group 709 and a statistic value 711 are acquired from powdery mildew collected data 710 on the collected data list 705 retained in the retaining unit 303. In step S808, the acquired collected data is sent to the communication unit 312 of the second apparatus 21 by the communication unit 304.

In step S809, the display control unit 309 of the second apparatus 21 generates and displays a screen for presenting information obtained by analyzing the collected data received via the communication unit 312. FIG. 9B shows a user interface screen in which the data obtained regarding powdery mildew in response to the operation performed on the item 902 shown in FIG. 9A is visualized in a data display area 903. In the data display area 903, an average value 905 and the like, which are obtained from the statistical information 708 of the collected data, are displayed in a statistical information display area 904. Also, the positions of objects regarding which data has been collected are displayed in a map 906, as shown by data points 907, based on the data coordinates 712 of pieces of data in the data group 709 of collected data. Here, the display color or the like of each data point 907 may be determined based on the data type or value of the data represented by the data point 907.

Furthermore, in step S810, the reception unit 310 receives a user operation regarding the collected data. For example, a user instruction is received such as a clicking operation by a mouse performed on the average value 905 displayed in the statistical information display area 904 or a data point 907 on the map 906. In step S811, the identification unit 311 identifies images to be requested based on the received user instruction. For example, when a clicking operation on the average value 905 is received, data who has a value near the average value 905 is selected. Data 713 is selected as data having a value near an average value 3% from the powdery mildew data group 709. An image identifier 714 representing the image associated with the data 713 is identified as the image to be requested. Also, when an operation on a data point 907 on the map 906 is received, data 715 represented by the data point 907 is selected from the powdery mildew data group 709. An image identifier 716 representing the image associated with the data 715 is identified as the image to be requested. In step S812, a request of identified image is sent to the communication unit 304 of the server apparatus 10 by the communication unit 312. For example, information regarding the image identifier 714 or 716 that is identified in step S811 is sent.

In step S813, the management unit 302 of the server apparatus 10 retains the image request received via the communication unit 304 in the retaining unit 303. For example, with reference to an image request list 1001 in FIG. 10, if the binary data of an image indicated by the received image identifier is not retained in retaining unit 303, a request status "requesting" as indicated by 1002 and 1003 is retained in the retaining unit 303. Note that, as indicated by 1004, with respect to an image whose binary data is "retained" in the retaining unit 303 of the server apparatus 10, as a result of image transmission processing described later, the binary data may be transferred to the client apparatus 21 as a response.

FIG. 11 is a sequence diagram illustrating the flow of processing executed by the constituent elements of the system according to the first embodiment in a stage of sending an image in response to the image request. In step S1101, the image request retained in step S813 is sent to the communication unit 308 of the first apparatus 20 by the communication unit 312 of the server apparatus 10. For example, a bidirectional communication channel is provided between the server apparatus 10 and the first apparatus 20, and transmission to the first apparatus 20 may be performed at every timing at which the server apparatus 10 has received an image request. Also, the configuration may be such that the first apparatus 20 regularly makes confirmation with the server apparatus 10, and the server apparatus 10 makes transmission in response thereto. In any cases, with reference to the image request list 1001 in FIG. 10, an image identifier of an image 1002 or 1003 whose status is "requesting" is sent. In step S1102, the management unit 306 of the first apparatus 20 selects an image indicated by the image request received via the communication unit 308. In step S1101, the binary data of the image is selected from the retaining unit 307 based on the image identifier sent from the server apparatus 10. In step S1103, the selected image is sent to the communication unit 304 of the server apparatus 10 by the communication unit 308. For example, the image identifier is sent along with the binary data of the selected image.

In step S1104, the management unit 302 of the server apparatus 10 retains the image received via the communication unit 304 in the retaining unit 303. For example, the binary data of the image is retained in the retaining unit 303 in association with the received identifier. Also, similarly to the row denoted by 1004 in the aforementioned image request list 1001, a request status "retained" is retained in the retaining unit 303. In step S1105, the management unit 302 sends the image retained in the retaining unit 303 to the communication unit 312 of the second apparatus 21. For example, a bidirectional communication channel is provided between the server apparatus 10 and the second apparatus 21, and transmission to the second apparatus 21 may be performed at every timing at which the server apparatus 10 has received image binary data. Also, the configuration may be such that the second apparatus 21 regularly makes confirmation with the server apparatus 10, and the server apparatus 10 sends image binary data in response thereto.

Figure 9C:
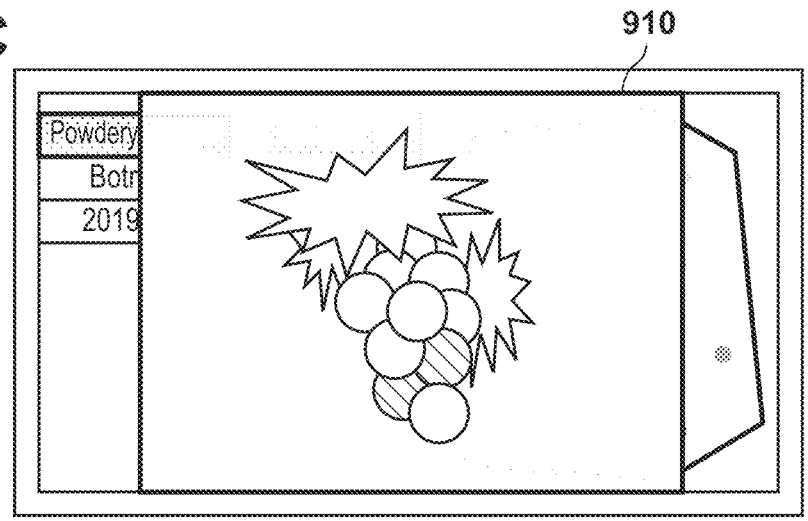
FIG. 9C is a diagram illustrating an example of a user interface that is displayed in a client apparatus.

In step S1106, the display control unit 309 of the second apparatus 21 generates and display a screen for presenting the image received via the communication unit 312. FIG. 9C is an example of a screen for presenting an identified image in the present embodiment. In FIG. 9C, the received image 910 is displayed in a superimposed manner in the user interface screen that is currently displayed. Note that the display mode is not limited to this display mode, and another window may be generated, and the generated window may be displayed side by side with the original operation screen.

According to the first embodiment described above, images desired by a person in charge or a knowledgeable person can be specified from accumulated image data of crops cultivated in a farm field based on the collected data and the operation instruction performed when the data is viewed, and the identified image can be displayed. The amount of image data that is daily recorded relating to the crop cultivation is huge. According to the present embodiment, because the image data of images other than the desired image is not sent, a large communication load is not incurred more than necessary and the storage capacity of the server apparatus is not consumed more than necessary. Therefore, even in a case where the person in charge or knowledgeable person is in a remote place from which it takes time to go to the site where images were captured, the information at the site can be efficiently sent, and needed judgment can be asked for. In particular, in a system in which a plurality of first client apparatuses 20 are connected, if all of the image data is accumulated in the server apparatus 10 regardless of the possibility of being requested from the second client apparatus 21, the load increases tremendously in terms of communication and the storage capacity of the server apparatus. In the present embodiment, in this case as well, the amount of image data that is sent and received via the server apparatus can be minimized.

Also, in the present embodiment, specifically, there is an effect that the time and effort of a task of finding out a desired image from many similar images can be saved, in crop cultivation, on both of the image providing side and the image provided side. For example, when the crops suffer some damage, a person in charge of the crops cultivated in the farm field and a knowledgeable person can find images that need to be checked by narrowing down the candidate images based on geographical information and statistic values of data, instead of visually recognizing minute differences between images. As a result of saving the time and effort of finding image data, the person concerned can focus on original tasks such as understanding the damage situation and performing appropriate judgment of measures to be taken in response thereto.

Note that, in the present embodiment, an example in which binary data of an original image is sent in response to an image request has been described, but the configuration may be such that the image request includes image size information, the image is resized according to the information of requested size, and the resized image is sent. In this case, the cost of data transfer from the first apparatus 20 and the data retaining cost of the server apparatus 10 can be reduced. Also, in the present embodiment, an example in which image binary data is not sent unless an image request is made, but the configuration may also be such that thumbnails of all images or thumbnails of images selected by a user of the first apparatus 20 are sent in step S403 as related information. In this case, processing for presenting thumbnail images in accordance with a predetermined operation made by the user on an operation screen displayed in step S809 is added, as a stage prior to the stage of requesting image data, for example. Accordingly, in the second apparatus 21, the desired image can be easily requested accurately, while suppressing the overall data communication amount.

Also, in the present embodiment, a system configured by a plurality of apparatuses has been described, but a configuration may be adopted in which some apparatus includes another apparatus. For example, the present embodiment can be realized with a configuration in which the information processing apparatus, which is described as the server apparatus 10, performs data input and display, for example. Also, the present embodiment can be realized with a configuration in which the first apparatus 20 and the second apparatus 21 include functions of the other apparatus.

Second Embodiment

In the first embodiment, an embodiment is illustrated in which the second client apparatus 21, after identifying desired images, requests the identified images to the first client apparatus 20, and images sent in response to the request is displayed. A mobile apparatus such as a tablet PC is envisioned as the first client apparatus 20 that has binary data of the identified image. A user can input data at a convenient place without restricting the place where the first client apparatus 20 is operated. However, there are cases where, if the area of the farm field in which crops are cultivated is quite large or the farm field is located in a suburban area, the communication environment of the first client apparatus 20 is not sufficiently prepared over the entirety of the farm field. In this case, if the second client apparatus 21 sends a request of a desired image when the first client apparatus 20 is unable to communicate, the request cannot reach the first client apparatus 20. Therefore, it is possible that the image display is delayed until the first client apparatus 20 returns to an environment in which communication is possible. In the second embodiment, an example will be described in which the server apparatus 10 further including a constituent element for identifying images to be desired by the second client apparatus 21, and accordingly, the desired image can be presented even if the first client apparatus 20 is in an offline environment. For example, it is possible that a person in charge or a knowledgeable person who is an operator of the second client apparatus 21 estimates, to some degree, a situation in which images need to be checked. Therefore, the person in charge or knowledgeable person operates the second client apparatus 21, and designates the condition for identifying images that is likely to be highly desired, in advance. A worker, after performing work in the farm field, operates the first client apparatus 20 that is in a state in which it can communicate, and instructs transmission of data. The person in charge or knowledgeable person can view the desired image regardless of the communication environment of the first client apparatus 20.

System Configuration

The system configuration according to the second embodiment and the hardware configurations of the apparatuses are similar to those of the first embodiment described using FIGS. 1 and 2, and therefore the description thereof will be omitted. FIG. 12 is a diagram illustrating an example of a software configuration of the system according to the second embodiment. The functional units that are in common with those in FIG. 3 are given the same reference numerals, and detailed description thereof will be omitted. A server apparatus 10 of the second embodiment includes an identification unit 1201. The identification unit 1201 is realized by a CPU 111 deploying a program stored in a ROM 113 to a RAM 112 and executing the later-described processing.

The identification unit 1201 identifies images to be requested from collected data. In the present embodiment, images to be requested are identified from images included in collected data by a management unit 302 based on the collected data.

Processing Flow

Figure 13:
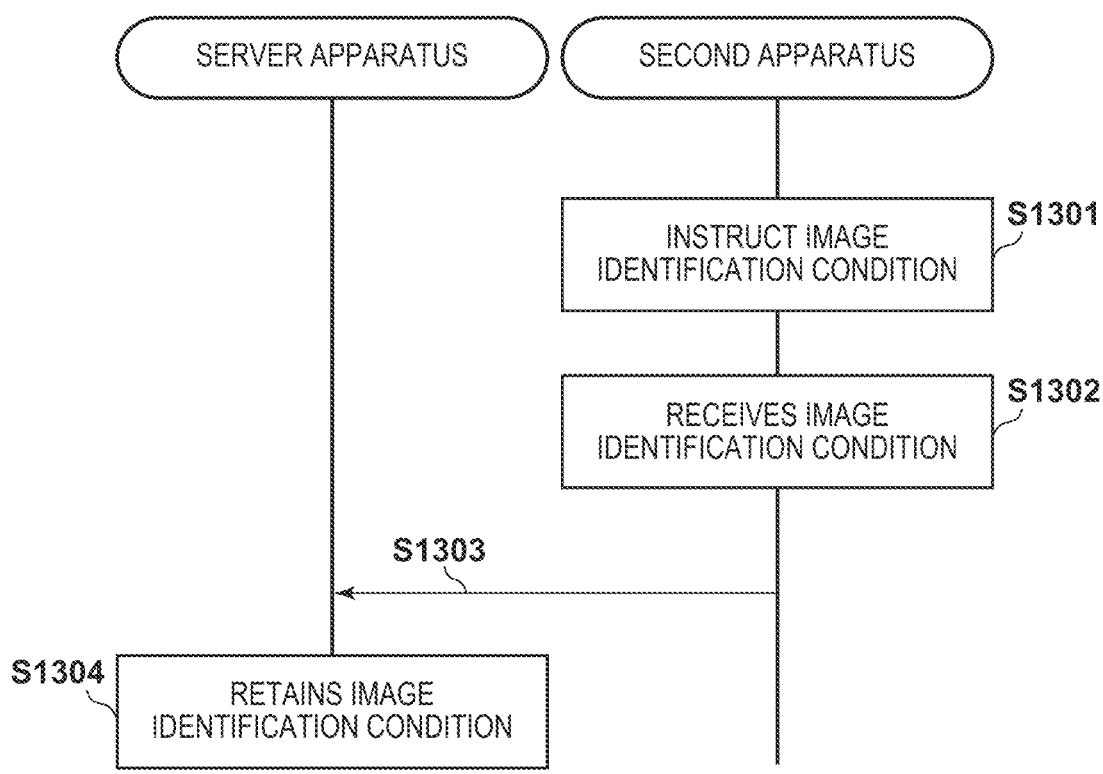
FIG. 13 is a sequence diagram showing a flow of processing performed by the constituent elements of the information processing system.

FIG. 13 is a sequence diagram illustrating the flow of processing executed by the constituent elements of the system according to the second embodiment in a stage of instructing a condition for identifying images to be requested. In the present embodiment, this processing is executed as an initial setting at the time of constructing the information processing system. Also, the setting is overwritten at any timing thereafter. In step S1301, a display control unit 309 of the second apparatus 21 generates and displays a screen for instructing the condition for identifying images to be requested from collected data. FIGS. 14A and 14B are examples of the screen for instructing the condition for identifying images to be requested, in the present embodiment. In a list display area 1401, collected data managed by the server apparatus 10 is displayed in a list format such that a user can easily make an instruction. Note that the items to be listed may be information defined as initial values, but a collected data list 705 managed by the server apparatus 10 based on data already collected in the first client apparatus 20 may be acquired via a communication unit 312 and the list may be displayed.

In this system, the group designated by a user instruction made on the list display area 1401 matches the purpose of the user viewing the image. For example, when a group is designated by data indicating various situations that occur in the farm field (occurrence of disease and pest, a case where dry weather or heavy rainfall continues) such as powdery mildew indicated by the item 902 selected in the example in FIG. 9A, the purpose of designation is for checking the degree of damage. Also, when a group sorted by date is designated, the purpose may be to check whether or not a distinguishing tendency is present in the data obtained in the designated date. Therefore, in the present embodiment, the user of the second client apparatus 21 can set an image identification condition corresponding to the purpose of each group, in advance. In an image identification condition area 1402, the condition for identifying images to be requested is displayed according to the group designated in the list display area 1401.

In step S1302, a reception unit 310 receives an input for designating the condition for identifying images, from the collected data, regarding which a sharing request is to be issued. For example, in the case illustrated in FIG. 14A, the numbers of images are received that are to be requested, and are associated with data of a minimum value, a maximum value, and an average value, as shown in the numbers that have been input in an area 1403, as the condition in the collected data of powdery mildew. In accordance with the purpose of checking the degree of damage due to powdery mildew, it is possible to set a large number, relative to the others, to the number of images to be requested that are associated with the maximum value (data indicating that the damage is large). Also, in the example in FIG. 14B, with respect to data collected by date based on the date and time of input data, for the purpose of checking the tendency of the data of the day, a condition can be set such that the same number of images associated with data of a data type whose frequency is high and images associated with data of a data type whose frequency is low are requested. Here, the reference for judging the level of frequency may be separately defined. In step S1303, the image identification condition is sent to a communication unit 304 of the server apparatus 10 by the communication unit 312.

In step S1304, the management unit 302 of the server apparatus 10 retains the image identification condition received via the communication unit 304 in a retaining unit 303. As shown in an image identification condition table 1501 in FIG. 15, an image identification condition 1503 is retained along with an ID 1502 as the identifier of collected data. Items in the table are retained in the retaining unit 303 in a manner of an image identification condition 1504 for the collected data of powdery mildew.

FIG. 16 is a sequence diagram illustrating the flow of processing executed by the constituent elements of the information processing system according to the second embodiment in a stage of identifying images to be requested. Note that steps that are in common with those of FIG. 5 are given the same number, and detailed description will be omitted. The processing flow in steps S401 to S405 is the same as that described in the first embodiment. The first apparatus 20 sends data to the server apparatus 10, and the server apparatus 10 collects and retains the data.

In step S1601, the identification unit 1201 of the server apparatus 10 identifies images to be requested based on the data collected in step S405 and the image identification condition. FIG. 17A illustrates a portion of the collected data of powdery mildew that is to be retained. Data is selected by searching the collected powdery mildew data group 1701 based on the image identification condition 1504 in the collected data of powdery mildew described above. Image identifiers (e.g., 1702 and 1703) representing images associated with data are identified as the image to be requested.

In step S1602, the management unit 302 retains the request of identified image in the retaining unit 303. For example, with reference to an image request list 1704 in FIG. 17B, if the binary data of an image indicated by the received image identifier is not retained in retaining unit 303, a request status "requesting" as indicated by 1705 and 1706 is retained in the retaining unit 303. Note that the request status is not updated with respect to an image whose request status is "retained", as indicated by 1704. The flow of processing executed by the constituent elements of the system according to the second embodiment in a stage of sending an image in response to an image request is the same as processing in steps S1101 to S1106 described in the first embodiment. However, the server apparatus 10 can perform processing in a synchronized manner in the processing from receiving data from the first apparatus 20 in step S403 until sending an image request in step S1101 via steps S1601 and S1602, for example. Accordingly, even if the first apparatus 20 enters an offline environment after completing data transmission to the server apparatus 10, a desired image can be presented in the second apparatus 21.

According to the second embodiment described above, as a result of designating a data condition for identifying desired images in advance, the images can be presented in the second client apparatus 21 regardless of the communication environment of the first client apparatus 20. Accordingly, a person in charge of crop cultivation or a knowledgeable person, who is the user of the second client apparatus 21, can quickly check the situation of a farm field. Therefore, when crops suffered from some damage, for example, appropriate judgment can be performed quickly. Also, similarly to the first embodiment, all image data need not be sent from the first client apparatus 20 to the server apparatus, and therefore the communication load regarding transmission and reception of image data and the load of the server apparatus can be suppressed. Also, the second embodiment may be used in combination with the first embodiment. That is, a step is added to determine whether or not the first client apparatus 20 is in a communication condition in which images can be sent and received in real time, by an inquiry from the server apparatus 10. Then, in a condition in which images can be sent and received in real time, the processing for identifying image data may be executed following the sequence in FIG. 8 described in the first embodiment, regardless of the identification condition defined in advance.

Note that, in the present embodiment, an example has been described in which images to be requested are identified based on a condition designated by a user of the second client apparatus 21, but images to be requested may be identified based on a condition determined in advance. For example, the configuration may be such that, based on the similarity with data regarding which images have been requested, images of similar data are identified. Accordingly, images can be requested and presented without the time and effort of the user designating the condition.

An embodiment of the present invention provides an information processing system in which an apparatus to which image data is provided can efficiently request images to be shared from an apparatus that provides image data.

Other Embodiments

Among the processing units described in the first and second embodiments, with respect to the identification unit 311 and the identification unit 1201, the processing may be performed using a trained model subjected to machine learning, instead of the identification processing based on a user instruction. In this case, the input data is groups that may be designated by the user in the second client apparatus 21, and the output data is an image identification conditions corresponding to the objects of selecting respective groups. Also, a plurality of combinations between the input data and the output data are prepared as learning data, knowledge is acquired by performing machine learning using the learning data, and a trained model that outputs output data with respect to input data based on the acquired knowledge is generated. Furthermore, if change or modification of the identified image is instructed by a user operation made on the second client apparatus 21 to which the image has been provided based on the identification condition that has been output, relearning may also be performed by acquiring new condition that has been generated based on the instruction as training data. The trained model can be configured by a neural network model, for example. Then, the trained model performs processing of the aforementioned processing unit by operating in cooperation with a CPU, a GPU, or the like as a program for performing equivalent processing as the processing unit. Note that the trained model may be updated after a certain amount of processing, as needed.

Also, in the first embodiment as well, similarly to the second embodiment, the first client apparatus 20 may also be configured to send shot images to the server apparatus 10, as appropriate, without receiving an image request from the server apparatus 10. Also, the first client apparatus 20 may be configured to send data along with an image in the processing in step S403. In this case, the server apparatus 10 may, upon identifying an image to be provided to the second client apparatus 21, send the image to the first client apparatus 20.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing system including a server apparatus, and a first apparatus and a second apparatus that are able to communicate with the server apparatus, the information processing system comprising:
  one or more memories storing instructions; and
  one or more processors that, upon executing the stored instructions, function as:
    a management unit configured to collect, based on a predetermined reference, each piece of data that is acquired from the first apparatus and is associated with each of a plurality of images and manage the collected data;
    an image identification unit configured to identify at least a portion of the plurality of images based on the collected data; and a sending unit configured to electronically send the at least a portion of the plurality of images that is identified by the image identification unit, to the second apparatus, wherein the management unit manages each piece of data associated with each of a plurality of images by collecting into a plurality of groups, wherein the image identification unit identifies the at least a portion of the plurality of images based on a group selected by a user instruction, out of the plurality of groups; and wherein the image identification unit identifies an image using a trained model obtained by performing learning using pieces of input data indicating respective groups selected by a user, and image identification conditions corresponding to the respective groups as output data.

2. The information processing system according to claim 1, wherein the sending unit sends an image acquired from the first apparatus to the second apparatus in response to a request from the server apparatus.

3. The information processing system according to claim 1, wherein the plurality of images are images shot for a record regarding crop cultivation.

4. The information processing system according to claim 3, wherein the first apparatus is an apparatus that shoots an image for a record regarding crop cultivation, and inputs data indicating observation details of a crop in association with the image, and the information processing system includes a plurality of the first apparatuses, and each of the first apparatuses is assigned to each of a plurality of blocks obtained by dividing a farm field in which the crop is cultivated, or each of a plurality of farm fields.

5. The information processing system according to claim 1, wherein the second apparatus includes:

one or more memories storing instructions; and one or more memories that, upon executing the stored instructions, function as:

a display control unit configured to display an operation screen on which the plurality of groups are selectable, in a display unit; and a unit configured to send, to the server apparatus, information for identifying the at least a portion of the plurality of images based on a group selected by at least a user instruction performed on the operation screen.

6. The information processing system according to claim 5, wherein the operation screen includes a list display area in which the plurality of groups are selectable and a data display area in which an analysis result of collected data is displayed regarding the group selected by the user instruction, and a map that is displayed based on position information, each of which is associated with each of the plurality of images, out of the data, is included in the data display area.

7. The information processing system according to claim 6, wherein the image identification unit identifies a portion of the plurality of images based on a point on the map that is instructed by a user, in the operation screen.

8. The information processing system according to claim 5, wherein the operation screen further includes a statistical information display area for displaying statistical information of data collected by the management unit for each group, and the second apparatus sends, to the server apparatus, information indicating an image identified based on statistical information instructed by a user in the statistical information display area.

9. The information processing system according to claim 1, wherein the image identification unit further identifies an image based on a similarity of data collected into one group by the management unit.

10. The information processing system according to claim 1, wherein the image identification unit identifies an image based on an image identification condition designated by the second apparatus.

11. A server apparatus that is able to communicate with a client apparatus, the server apparatus comprising:

one or more memories storing instructions; and one or more processors that, upon executing the stored instructions, function as:

a collecting unit configured to collect each piece of data associated with each of a plurality of images that are shot as an observation record of crop cultivation, based on observation details of a crop indicated by the pieces of data;

a determining unit configured to determine an image to be sent to the client apparatus, among the plurality of images, based on a collection result of the collecting unit; and a first sending unit configured to send, to the client apparatus, at least one or more images, among the plurality of images, determined by the determining unit, wherein the collection unit manages each piece of data associated with each of a plurality of images by collecting into a plurality of groups, wherein the determining unit identifies the image to be sent among the plurality of images based on a group selected by a user instruction, out of the plurality of groups; and wherein the determining unit identifies the image using a trained model obtained by performing learning using pieces of input data indicating respective groups selected by a user, and image identification conditions corresponding to the respective groups as output data.

12. The server apparatus according to claim 11, wherein the collecting unit collects the each piece of data associated with each of the plurality of images by crop observation date and time, types of disease and pest from which crops suffer, or a growth index of crops, which is indicated by the pieces of data.

13. The server apparatus according to claim 11, wherein the one or more processors further execute the stored instructions to function as:

a second sending unit configured to send the collection result of the collecting unit to the client apparatus; and a first receiving unit configured to receive information for identifying a portion of the plurality of images from the client apparatus in response to the sending of the collection result by the second sending unit, wherein the determining unit determines at least one or more images that are identified based on the information received by the first receiving unit as images to be sent to the client apparatus.

14. The server apparatus according to claim 11, wherein the determining unit determines an image that satisfies a condition designated by the client apparatus in advance, among the plurality of images, as an image to be sent to the client apparatus.

15. The server apparatus according to claim 11, wherein the one or more processors further execute the stored instructions to function as:
   a requesting unit configured to request at least one or more images, among the plurality of images, that are determined by the determining unit, to another client apparatus that is different from the client apparatus,
   wherein the first sending unit sends the at least one or more images, among the plurality of images, that are acquired from the other client apparatus in response to a request from the requesting unit, to the client apparatus.

16. The server apparatus according to claim 15,
   wherein the other client apparatus is an apparatus that shoots an image for a record regarding crop cultivation, and inputs data indicating observation details of a crop in association with the image, and
   the other client apparatus is an apparatus that is used by a person in charge of crop cultivation or a person knowledgeable in crop cultivation.

17. An information processing method by an information processing system including a server apparatus, and a first apparatus and a second apparatus that are able to communicate with the server apparatus, the information processing method comprising:
   collecting, based on a predetermined reference, each piece of data that is acquired from the first apparatus and is associated with each of a plurality of images and manage the collected data;
   identifying at least a portion of the plurality of images based on the collected data;
   sending the at least a portion of the identified plurality of images to the second apparatus,
   wherein the collecting further comprises managing each piece of data associated with each of a plurality of images by collecting into a plurality of groups,
   wherein the identifying identifies the at least a portion of the plurality of images based on a group selected by a user instruction, out of the plurality of groups; and
   wherein the identifying identifies an image using a trained model obtained by performing learning using pieces of input data indicating respective groups selected by a user, and image identification conditions corresponding to the respective groups as output data.

18. An information processing method by a server apparatus that is able to communicate with a client apparatus, the information processing method comprising:
   collecting each piece of data associated with each of a plurality of images that are shot as an observation record of crop cultivation, based on observation details of a crop indicated by the pieces of data;
   determining an image to be sent to the client apparatus, among the plurality of images, based on the collection result; and
   sending, to the client apparatus, at least one or more images, among the determined plurality of images,
   wherein the collecting further comprises managing each piece of data associated with each of a plurality of images by collecting into a plurality of groups,
   wherein the determining identifies the image based on a group selected by a user instruction, out of the plurality of groups; and
   wherein the determining identifies the image using a trained model obtained by performing learning using pieces of input data indicating respective groups selected by a user, and image identification conditions corresponding to the respective groups as output data.

* * * * *